United States Patent
Yin et al.

(10) Patent No.: US 9,576,747 B2
(45) Date of Patent: Feb. 21, 2017

(54) HYBRID ENERGY STORAGE DEVICE

(71) Applicants: Tsinghua University, Beijing (CN); HON HAI PRECISION INDUSTRY CO., LTD., New Taipei (TW)

(72) Inventors: Yan-Li Yin, Beijing (CN); Chang-Hong Liu, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 200 days.

(21) Appl. No.: 14/451,838

(22) Filed: Aug. 5, 2014

(65) Prior Publication Data
US 2015/0332861 A1 Nov. 19, 2015

(30) Foreign Application Priority Data

May 19, 2014 (CN) .......................... 2014 1 02111418

(51) Int. Cl.
| | |
|---|---|
| *H01G 11/08* | (2013.01) |
| *H01M 12/00* | (2006.01) |
| *H01G 11/52* | (2013.01) |
| *H01M 4/06* | (2006.01) |
| *H01M 4/583* | (2010.01) |
| *H01M 16/00* | (2006.01) |
| *H01G 11/04* | (2013.01) |
| *H01G 11/36* | (2013.01) |
| *H01G 11/38* | (2013.01) |
| *H01M 4/00* | (2006.01) |
| *H01M 10/06* | (2006.01) |
| *H01M 10/052* | (2010.01) |

(52) U.S. Cl.
CPC .............. *H01G 11/08* (2013.01); *H01G 11/04* (2013.01); *H01G 11/36* (2013.01); *H01G 11/38* (2013.01); *H01G 11/52* (2013.01); *H01M 4/00* (2013.01); *H01M 4/06* (2013.01); *H01M 4/583* (2013.01); *H01M 12/005* (2013.01); *H01M 16/00* (2013.01); *H01M 10/052* (2013.01); *H01M 10/06* (2013.01)

(58) Field of Classification Search
None
See application file for complete search history.

(56) References Cited

U.S. PATENT DOCUMENTS

| | | | | |
|---|---|---|---|---|
| 2010/0178543 | A1* | 7/2010 | Gruner ................... | B82Y 30/00 429/121 |
| 2011/0261502 | A1* | 10/2011 | Gruner ................... | H01G 11/02 361/502 |
| 2012/0014038 | A1* | 1/2012 | Meng ..................... | H01G 11/26 361/502 |

* cited by examiner

*Primary Examiner* — Miriam Stagg
*Assistant Examiner* — Wojciech Haske
(74) *Attorney, Agent, or Firm* — Zhigang Ma

(57) ABSTRACT

A hybrid energy storage device includes a positive pole including a supercapacitor first electrode and a battery positive electrode located in a same plane and contacts with each other, a negative pole including a supercapacitor second electrode and a battery negative electrode located in a same plane and contacts with each other, and a separator located between the positive pole and the negative pole. The supercapacitor second electrode, the battery negative electrode, the supercapacitor first electrode, the battery positive electrode, and the separator are planar structures. The supercapacitor first electrode, the supercapacitor second electrode, the battery positive electrode, the battery negative electrode, the separator and electrolyte are packaged in a shell.

2 Claims, 5 Drawing Sheets

HYBRID ENERGY STORAGE DEVICE

CROSS-REFERENCE TO RELATED APPLICATIONS

This application claims all benefits accruing under 35 U.S.C. §119 from China Patent Application No. 201410211141.8, filed on May 19, 2014, in the China Intellectual Property Office. This application is related to commonly-assigned application entitled, "HYBRID ENERGY STORAGE DEVICE", concurrently filed (Atty. Docket No. US53945). Disclosures of the above-identified applications are incorporated herein by reference.

FIELD

The present application relates to an electrical energy storage device, and particularly to an energy storage device combining a supercapacitor with a battery.

BACKGROUND

As the most common electrical energy storage devices, rechargeable battery can supply high energy density, but its low power density and short cycle-life limits some special applications such as high current charge-discharge. Compared with the rechargeable battery, supercapacitor can provide higher power density and more outstanding cycle stability, but their energy density is much lower. Therefore, hybrid of the rechargeable battery and the supercapacitor with qualities of both has been investigated.

A conventional energy storage device with qualities of both the rechargeable battery and the supercapacitor includes a capacitor and a battery electrically connecting with the capacitors, wherein the capacitor and the battery are separate. The conventional energy storage device further includes a voltage control module because the capacitor and the battery have different operating voltages. Thus, the conventional energy storage device has larger volume and higher cost.

What is needed, therefore, is to provide a hybrid energy storage device that can overcome the above-described shortcomings.

BRIEF DESCRIPTION OF THE DRAWINGS

Implementations of the present technology will now be described, by way of example only, with reference to the attached figures, wherein.

DETAILED DESCRIPTION

Figure 1:
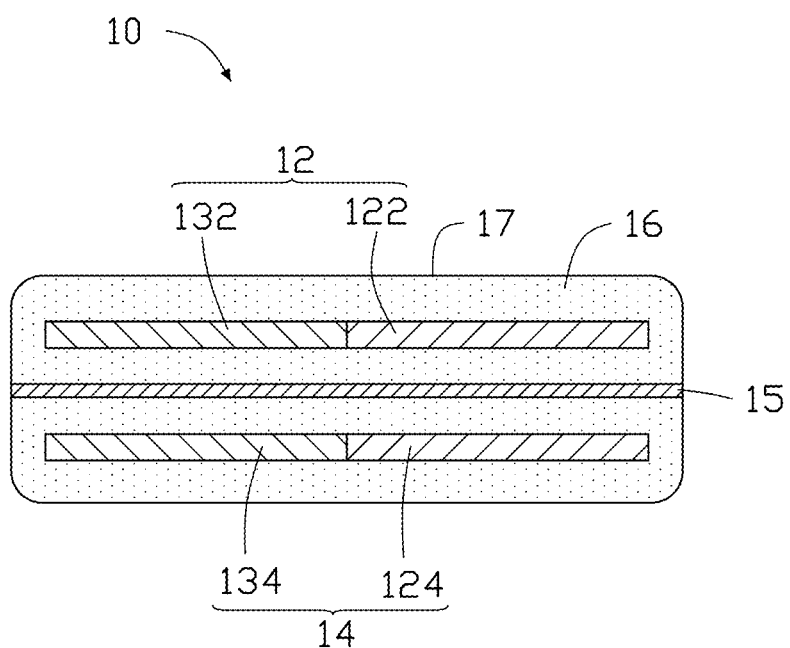
FIG. 1 is a schematic view of one embodiment of a hybrid energy storage device.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "outside" refers to a region that is beyond the outermost confines of a physical object. The term "inside" indicates that at least a portion of a region is partially contained within a boundary formed by the object. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "comprising" means "including, but not necessarily limited to"; it specifically indicates open-ended inclusion or membership in a so-described combination, group, series and the like.

Figure 2:
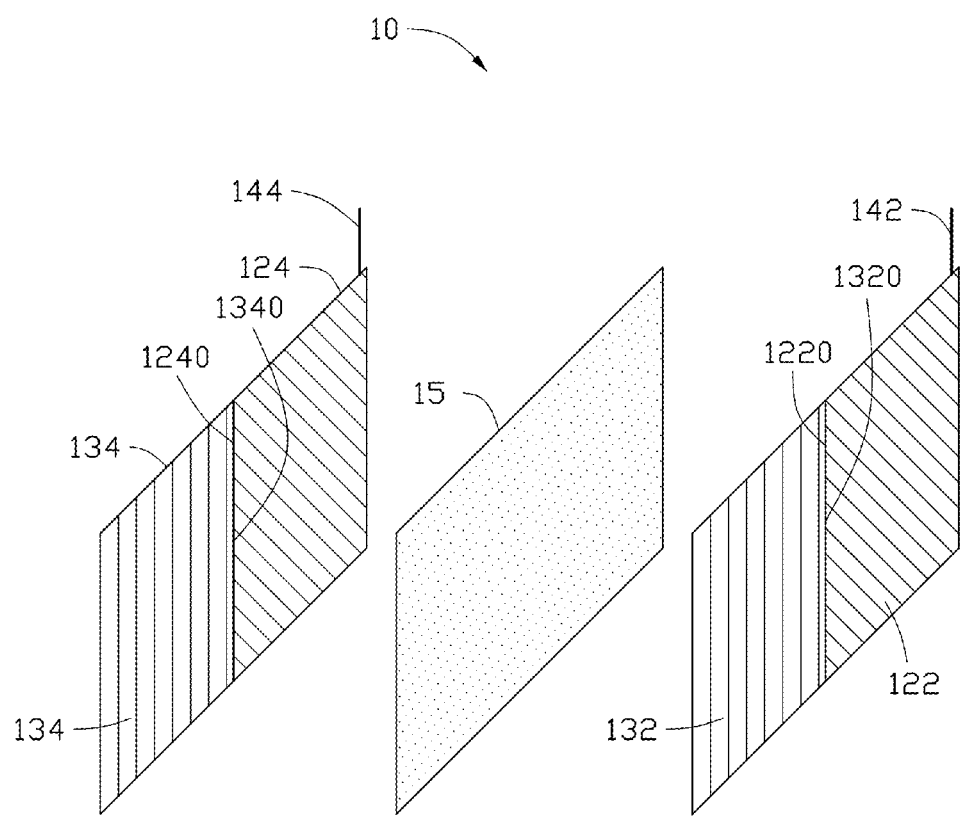
FIG. 2 is a schematic view of electrode elements arrangement of one embodiment of the hybrid energy storage device of FIG. 1.

Referring to FIGS. 1 and 2, a hybrid energy storage device 10 of one embodiment combining a supercapacitor with a battery in parallel includes a supercapacitor first electrode 122, a supercapacitor second electrode 124, a battery positive electrode 132, a battery negative electrode 134, a separator 15, electrolyte 16, and a shell 17.

The supercapacitor first electrode 122, the supercapacitor second electrode 124, the battery positive electrode 132, the battery negative electrode 134, and the separator 15 are planar structures and located in the electrolyte 16. The supercapacitor first electrode 122, the supercapacitor second electrode 124, the battery positive electrode 132, the battery negative electrode 134, the separator 15, and the electrolyte 16 are packaged in the shell 17.

The supercapacitor first electrode 122 and the battery positive electrode 132 are in a same plane and contacts with each other to form a positive pole 12 of the hybrid energy storage device 10, wherein a first side 1220 of the supercapacitor first electrode 122 contacts with a second side 1320 of the battery positive electrode 132. The supercapacitor second electrode 124 and the battery negative electrode 134 are in a same plane and contacts with each other to form a negative pole 14 of the hybrid energy storage device 10, wherein a third side 1240 of the supercapacitor second electrode 124 contacts with a fourth side 1340 of the battery negative electrode 134. The separator 15 is located between the positive pole 12 and the negative pole 14 of the hybrid energy storage device 10. The supercapacitor first electrode 122 is directly opposite to the supercapacitor second electrode 124. The battery positive electrode 132 is directly opposite to the battery negative electrode 134.

Figure 3:
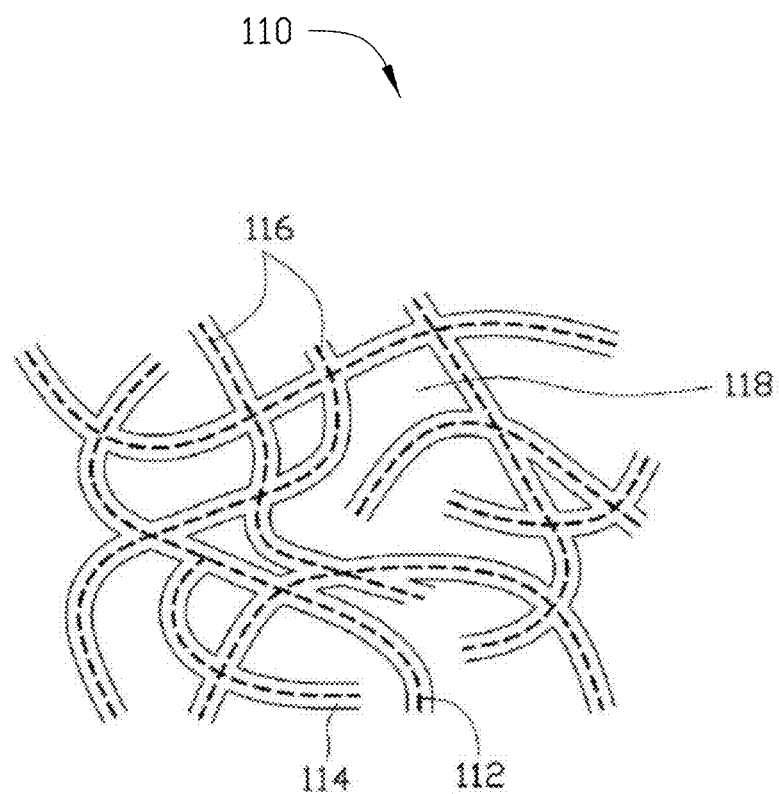
FIG. 3 is a schematic view of an embodiment of a CNT/PANI composite film of a supercapacitor.

The supercapacitor includes the supercapacitor first electrode 122 and the supercapacitor second electrode 124. In one embodiment, at least one of the supercapacitor first electrode 122 and the supercapacitor second electrode 124 include is a carbon nanotube/polyaniline (CNT/PANI) composite film 110, as shown in FIG. 3. The CNT/PANI composite film 110 includes a carbon nanotube network structure 116 and a polyaniline layer 114, wherein the polyaniline layer 114 includes a conductive polymer. The CNT/PANI composite film 110 has a first surface and a second surface opposite to the first surface, and the first surface and the second surface are in direct contact with the electrolyte 16. In one embodiment, the carbon nanotube network structure 116 is a carbon nanotube paper.

The carbon nanotube network structure 116 includes a plurality of carbon nanotubes 112 combined by van der Waals attractive force therebetween and forming a free-standing film network. The term "free-standing" includes, but is not limited to, a structure that does not have to be supported by a substrate and can sustain its own weight when it is hoisted by a portion of the structure without any significant damage to its structural integrity. The free-standing property is achieved only due to the van der Waals attractive force between adjacent carbon nanotubes 112. The carbon nanotube network structure 116 includes a plurality of micropores 118 formed by adjacent carbon nanotubes 112. A size of the plurality of micropores 118 can be in a range from about 60 nanometers to about 400 nanometers.

The polyaniline layer 114 is coated on a surface of the carbon nanotube network structure 116. The polyaniline layer 114 wraps around the plurality of carbon nanotubes 112 to form a tubular coating layer structure. The carbon nanotube network structure 116 serves as the core and the template to support the polyaniline layer 114. In one embodiment, the polyaniline layer 114 is coated on the entire surface of the carbon nanotube network structure 116, such that the surface of each carbon nanotube 112 is coated by the polyaniline layer 114. The supercapacitor first electrode 122 and the supercapacitor second electrode 124 show thinness, light-weight, flexibility and enhanced electrochemical properties, because the supercapacitor first electrode 122 and the supercapacitor second electrode 124 include the plurality of carbon nanotubes 112 and micropores 118.

The plurality of carbon nanotubes 112 can be orderly or disorderly arranged. The term 'disordered CNT structure' includes, but is not limited to, a structure in which the plurality of carbon nanotubes 112 is arranged along many different directions so that the number of carbon nanotubes 112 arranged along each different direction can be almost the same (e.g. uniformly disordered) and/or entangled with each other. The term 'ordered CNT structure' includes, but is not limited to, a structure in which the plurality of carbon nanotubes 112 is arranged in a consistently systematic manner, e.g., the plurality of carbon nanotubes 112 is arranged approximately along a same direction and or have two or more sections within each of which the plurality of carbon nanotubes 112 are arranged approximately along a same direction (different sections can have different directions). In one embodiment, the carbon nanotube network structure 116 includes the plurality of carbon nanotubes 112 disorderly arranged and parallel to the surface of the carbon nanotube network structure 116.

The plurality of carbon nanotubes 112 can be single-walled, double-walled, multi-walled carbon nanotubes, or their combinations. The plurality of carbon nanotubes 112 which are single-walled have a diameter of about 0.5 nanometers (nm) to about 50 nm. The plurality of carbon nanotubes 112 which are double-walled have a diameter of about 1.0 nm to about 50 nm. The plurality of carbon nanotubes 112 which are multi-walled have a diameter of about 1.5 nm to about 50 nm.

A method for making the CNT/PANI composite film 110, according to one embodiment, includes:

(S10), fabricating the plurality of carbon nanotubes 112 by chemical vapor deposition (CVD) on a silicon wafers with iron as a catalyst and acetylene as a precursor;

(S11), obtaining a uniform carbon nanotube suspension by ultrasonic oscillating the plurality of carbon nanotubes 112 in ethanol, wherein a time of ultrasonic oscillating is about 10 minutes, and a power of the ultrasonic oscillating is about 800 watts;

(S12), filtrating the carbon nanotube suspension through a microporous membrane with the aid of vacuum;

(S13), forming the carbon nanotube network structure 116 and drying the carbon nanotube network structure 116 at about 80 degrees Celsius for 12 hours in a vacuum oven, wherein the carbon nanotube network structure 116 is removed off from the microporous membrane;

(S14), immersing the carbon nanotube network structure 116 in 40 ml aqueous solution containing 0.04 mol $L^{-1}$ HCL and 0.002 mol $L^{-1}$ aniline monomers (purity≥99.5%) for ten minutes of complete infiltration;

(S15), dropping 40 ml precooled aqueous solution containing 0.002 mol $L^{-1}$ ammonium persulfate, wherein the ammonium persulfate is as oxidant for polymerization;

(S16), putting mixed solution of step (S15) at 0 degrees Celsius for 24 hours to react completely resulting in the polyaniline layer 114 coated uniformly on the carbon nanotube network structure 116, to form the CNT/PANI composite film 110; and (S17), picking out the CNT/PANI composite film 110 from the reacted solution, cleaning the CNT/PANI composite film 110 with deionized water, acetone and ethanol, and drying the CNT/PANI composite film 110 at 80 degrees Celsius in the vacuum oven for 12 hours.

Figure 4:
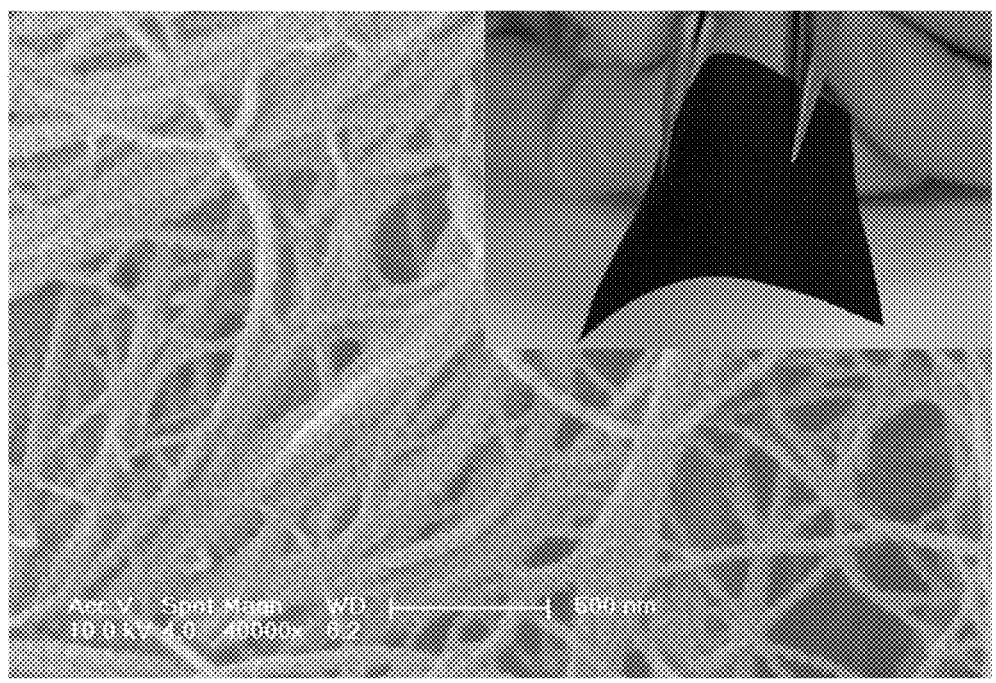
FIG. 4 shows a scanning electron microscope (SEM) image of the CNT/PANI composite film of FIG. 3.

A scanning electron microscope (SEM) image of the CNT/PANI composite film 110 is as shown in FIG. 4. The CNT/PANI composite film 110 can be cut into rectangles with the same size of 1.2 cm×1.4 cm, to form the supercapacitor first electrode 122 and the supercapacitor second electrode 124.

When an electrode of the supercapacitor is only made of carbon nanotubes, an electrical doule-layer capacity of the supercapacitor is only about 80 F/g but cycle life is long. When the electrode of the supercapacitor is only made of polyaniline, a pseudo capacity of the supercapacitor is greater than 10 times as large as the electrical doule-layer capacity but cycle life is short. In one embodiment, at least one of the supercapacitor first electrode 122 and the supercapacitor second electrode 124 is made of the CNT/PANI composite film 110, the supercapacitor has higher electric capacity and longer cycle life, and the electric capacity is up to 400 F/g. The supercapacitor has certain flexibility and can be arbitrarily bended.

The battery includes the battery positive electrode 132 and the battery negative electrode 134. The battery can be a primary battery, such as zinc manganese battery, or lithium metal battery. The battery can be a secondary battery, such as lead-acid battery, or lithium-ion battery. In one embodiment, the battery is the lead-acid battery. A positive active material of the lead-acid battery is lead dioxide, and a negative active material of the lead-acid battery is lead. A length and width of the battery positive electrode 132 and the battery negative electrode 134 are the same the length and width of the supercapacitor first electrode 122 and the supercapacitor second electrode 124. A thickness of the battery positive electrode 132 and the battery negative electrode 134 can be in a range from about 2 millimeters (mm) to about 4 mm.

The battery positive electrode 132 of the battery includes positive active material. The positive active material of the lead-acid battery can be made of carbon nanotube/lead dioxide composite material. The battery negative electrode 134 of the battery includes negative active material. The negative active material of the lead-acid battery can be made of carbon nanotube/lead composite material. The carbon nanotube/lead dioxide composite material can be made by mixing multi-walled carbon nanotubes and lead dioxide powder and filtrating to a membrane. The carbon nanotube/lead composite material can be made by mixing multi-walled carbon nanotubes and lead powder and filtrating to a membrane. The battery positive electrode 132 and the battery negative electrode 134 of the lead-acid battery are flexibility because the presence of the carbon nanotubes.

The battery positive electrode 132 includes a positive current collector 142, and the battery negative electrode 134 includes a negative current collector 144. A thickness of the positive current collector 142 and the negative current collector 144 can be in a range from about 1 micro to about 200 micros. The positive active material covers at least one surface of the positive current collector 142. The negative active material covers at least one surface of the negative current collector 144. The positive current collector 142 and the negative current collector 144 can be selected according to need.

The separator 15 can separate the positive pole 12 and the negative pole 14. The separator 15 prevents positive active material of the positive pole 12 and the negative active material of the negative pole 14 from directly contact. The separator 15 can make ions in the electrolyte 16 move between the positive pole 12 and the negative pole 14 of the hybrid energy storage device 10. The separator 15 can be made of non-metallic material and include a plurality of pores to make the ions go through. The non-metallic material can be polypropylene, or glass fiber membrane (AGM). The electrolyte 16 can be liquid or gel and can be selected according to need. The shell 17 can be a closed structure.

In one embodiment, there is a synergistic reaction between the lead-acid battery and the supercapacitor in the hybrid energy storage device 10. In the process of large current charging, the supercapacitor is first quickly charged. And then the supercapacitor is slowly discharged and meanwhile slowly charged the lead-acid battery. In the process of large current discharging, the supercapacitor is first quickly discharged. And then the lead-acid battery is slowly discharged and meanwhile slowly charged the supercapacitor. Thus, in the process of large current charging and discharging, charging and discharging current of the lead-acid battery in the hybrid energy storage device 10 is less than charging and discharging current of an independent lead-acid battery. A reduction in charging and discharging current of the lead-acid battery can protect the battery negative electrode 134 and improve utilization of the electrode material of the lead-acid battery. Thus, useful time and power of the hybrid energy storage device 10 can be improved.

When weight ratio between the battery positive electrode 132 and the supercapacitor first electrode 122 is in a range from about 1000:1 to about 125:1, and weight ratio between the battery negative electrode 134 and the supercapacitor second electrode 124 is in a range from about 1000:1 to about 125:1, the hybrid energy storage device 10 has good galvanostatic charging-discharging performance. When weight ratio between the battery positive electrode 132 and the supercapacitor first electrode 122 is about 1000:3, and weight ratio between the battery negative electrode 134 and the supercapacitor second electrode 124 is about 1000:3, the hybrid energy storage device 10 has the best galvanostatic charging-discharging performance.

Figure 5:
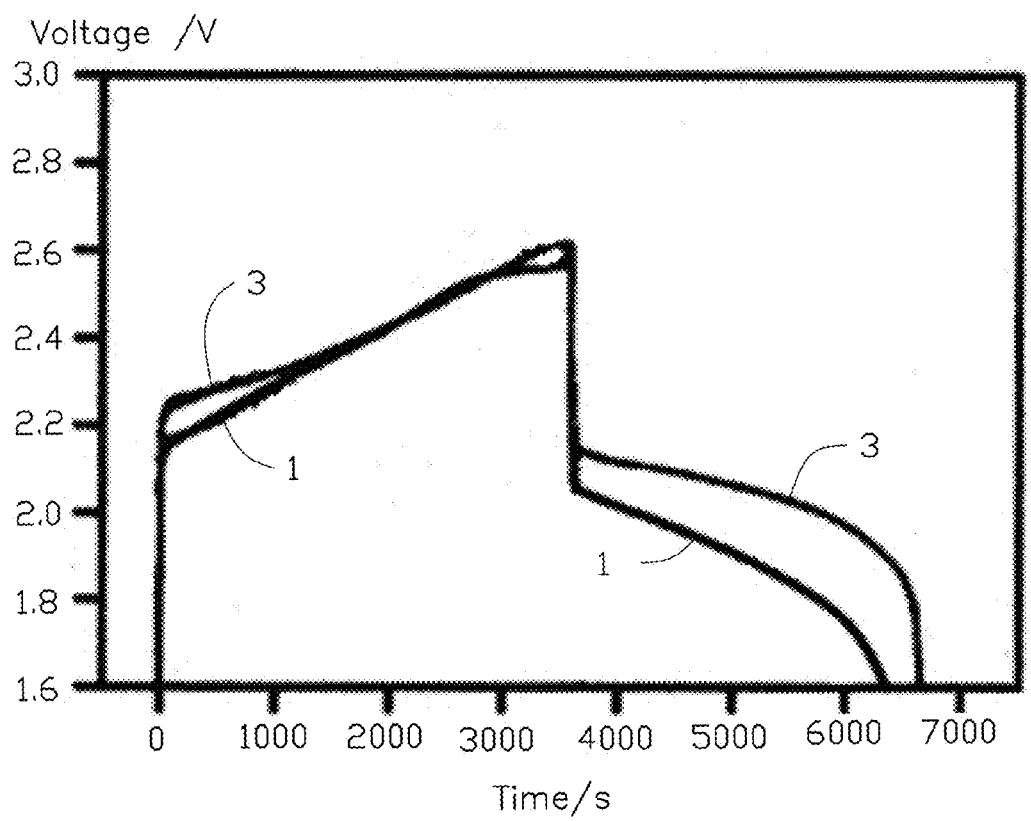
FIG. 5 shows galvanostatic charging-discharging curves of the hybrid energy storage device of FIG. 1.

Referring to FIG. 5, to compare the electrochemical performance of the independent lead-acid battery and the hybrid energy storage device 10 at high rate charging-discharging state, galvanostatic charging-discharging experiments are performed as the following steps:

(S20), charging both independent lead-acid battery and the hybrid energy storage device 10 at the same current of about 60 mA for 1 hour from the initial window potential of about 1.6 volts; and (S21), discharging both independent lead-acid battery and the hybrid energy storage device 10 at the same current of about 60, until a voltage of the independent lead-acid battery and the hybrid energy storage device 10 decreases to 1.6 volts.

As shown in FIG. 5, curve 3 indicates a galvanostatic charging-discharging curve of the hybrid energy storage device 10, and curve 1 indicates a galvanostatic charging-discharging curve of the independent lead-acid battery. In this embodiment shown in FIG. 5, the weight ratio between the battery positive electrode 132 and the supercapacitor first electrode 122 of the hybrid energy storage device 10 is about 1000:3. Voltage of the hybrid energy storage device 10 decreases to 1.6 volts at 6600 seconds. Discharging time of the hybrid energy storage device 10 has about 300 seconds more than the discharging time of the independent lead-acid battery. A galvanostatic discharging voltage of the hybrid energy storage device 10 is greater than a galvanostatic discharging voltage of the independent lead-acid battery at the same time.

The supercapacitor and the battery have the same operating voltages because the supercapacitor and the battery are located in the electrolyte 16 and packaged by the shell 17. Thus a voltage control module can be omitted in the hybrid energy storage device 10. The hybrid energy storage device 10 has smaller volume and lower cost.

An embodiment of a hybrid energy storage device 10 is shown, where the battery is the zinc manganese battery.

The positive active material of the zinc manganese battery can be made of carbon nanotube/manganese dioxide composite material, and the negative active material of the zinc manganese battery can be made of carbon nanotube/zinc composite material. The carbon nanotube/manganese dioxide composite material can be made by mixing multi-walled carbon nanotubes and manganese dioxide powder and filtrating to a membrane. The carbon nanotube/zinc composite material can be made by mixing multi-walled carbon nanotubes and zinc powder and filtrating to a membrane. The battery positive electrode 132 and the battery negative electrode 134 of the zinc manganese battery are more flexible because the presence of the carbon nanotubes. In one embodiment, the electrolyte 16 is made of ammonia chloride.

In summary, the hybrid energy storage device 10 combining the supercapacitor with the battery in parallel has a small volume and a lower cost of manufacture. Furthermore, the hybrid energy storage device 10 has certain flexibility and can be arbitrarily bended or twisted and can be used in wearable electronic equipments.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A hybrid energy storage device, comprising:
a positive pole comprising a supercapacitor first electrode and a battery positive electrode located in a same plane and electrically connected with each other, wherein the supercapacitor first electrode and the battery positive electrode are planar structures;
a negative pole comprising a supercapacitor second electrode and a battery negative electrode located in a same plane and electrically connected with each other, wherein the supercapacitor second electrode and the battery negative electrode are planar structures;
a separator located between the positive pole and the negative pole, wherein the separator is a planar structure; and
a housing having the supercapacitor first electrode, the supercapacitor second electrode, the battery positive electrode, the battery negative electrode, the separator and electrolyte located therein; wherein the supercapacitor first electrode, the supercapacitor second electrode, the battery positive electrode, the battery negative electrode, and the separator are located in the electrolyte; wherein the supercapacitor first electrode and the supercapacitor second electrode comprise a carbon nanotube/polyaniline composite film comprising a carbon nanotube network structure, and the carbon nanotube network structure is a free-standing structure; the carbon nanotube/polyaniline composite film has a first surface and a second surface opposite to the first surface, and the first surface and the second surface are in direct contact with the electrolyte.

2. A hybrid energy storage device, comprising:
a positive pole comprising a supercapacitor first electrode and a battery positive electrode located in a same plane and contacts with each other;
a negative pole comprising a supercapacitor second electrode and a battery negative electrode located in a same plane and contacts with each other;
a separator located between the positive pole and the negative pole; and
electrolyte infiltrating the supercapacitor first electrode, the supercapacitor second electrode, the battery positive electrode, the battery negative electrode, and the separator; wherein the supercapacitor first electrode and the supercapacitor second electrode comprise a carbon nanotube/polyaniline composite film comprising a carbon nanotube network structure, and the carbon nanotube network structure is a free-standing structure; and the carbon nanotube/polyaniline composite film has a first surface and a second surface opposite to the first surface, and the first surface and the second surface are in direct contact with the electrolyte.

* * * * *